United States Patent
Mallappa

(10) Patent No.: US 11,520,863 B2
(45) Date of Patent: Dec. 6, 2022

(54) SYSTEMS AND METHODS FOR IMPORTING SOFTWARE LICENSE METRIC DATA INTO A CONFIGURATION MANAGEMENT DATABASE (CMDB)

(71) Applicant: ServiceNow, Inc., Santa Clara, CA (US)

(72) Inventor: Preetam Mallappa, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 391 days.

(21) Appl. No.: 16/287,655

(22) Filed: Feb. 27, 2019

(65) Prior Publication Data
US 2020/0272707 A1    Aug. 27, 2020

(51) Int. Cl.
| | |
|---|---|
| *G06F 21/10* | (2013.01) |
| *G06F 16/28* | (2019.01) |
| *G06F 16/35* | (2019.01) |
| *G06F 16/22* | (2019.01) |
| *G06F 9/54* | (2006.01) |

(52) U.S. Cl.
CPC .............. *G06F 21/105* (2013.01); *G06F 9/54* (2013.01); *G06F 16/2282* (2019.01); *G06F 16/285* (2019.01); *G06F 16/35* (2019.01)

(58) Field of Classification Search
CPC ...... G06F 21/105; G06F 21/10; G06F 21/629; G06F 21/121; G06F 21/44; G06F 21/445; G06F 16/285; G06F 16/2282; G06F 16/35; G06F 9/54; G06Q 30/018
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |

(Continued)

*Primary Examiner* — Usmaan Saeed
*Assistant Examiner* — William P Bartlett
(74) *Attorney, Agent, or Firm* — Fletcher Yoder PC

(57) ABSTRACT

The present disclosure relates to importing license data from a license metric tool server (LMTS) into a configuration management database (CMDB). License records are requested and received from the LMTS and are subsequently imported as into the CMDB of a client instance as configuration item (CI) data. In certain circumstances, a license record may have an identifier field (ID) value that does not correspond to a CI of the CMDB, resulting in the license record failing to import. The disclosed process involves flagging license records that fail import, and then clustering the flagged license records into suitable groups. The flagged license records are then re-pulled from the LMTS in groups, rather than using individual requests for each flagged license record. By effectively clustering of the flagged license records into groups, the disclosed importation process enables a reduction in processing, memory, and/or communication overhead, improving operation of the client instance.

19 Claims, 7 Drawing Sheets

(56) References Cited

U.S. PATENT DOCUMENTS

| | | |
|---|---|---|
| 7,170,864 B2 | 1/2007 | Matharu |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,122,878 B1* | 9/2015 | Curry ............... G06F 21/121 |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueeler |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 2007/0078992 A1* | 4/2007 | Bloch ............... G06F 16/9574 709/228 |
| 2011/0067117 A1* | 3/2011 | Nagumo ............ H04N 1/00344 726/30 |
| 2011/0296405 A1* | 12/2011 | Ogura ............... G06F 21/105 717/178 |
| 2012/0047242 A1* | 2/2012 | Iwasaki ............. H04N 1/32106 709/223 |
| 2016/0048774 A1* | 2/2016 | Prickett ............. G06F 21/105 705/59 |
| 2017/0220778 A1* | 8/2017 | Fuse ..................... G06F 8/71 |
| 2017/0242985 A1* | 8/2017 | Asahara ................ G06F 21/10 |
| 2017/0308687 A1* | 10/2017 | Marnell ............ G06F 21/6218 |
| 2018/0210707 A1* | 7/2018 | Stallmann .......... H04L 41/0893 |
| 2019/0005107 A1* | 1/2019 | Carey ................ G06F 16/221 |

* cited by examiner

SYSTEMS AND METHODS FOR IMPORTING SOFTWARE LICENSE METRIC DATA INTO A CONFIGURATION MANAGEMENT DATABASE (CMDB)

BACKGROUND

The present disclosure relates generally to software license management and, more specifically, to importing license data from a license metric tool server (LMTS) into a configuration management database (CMDB).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In certain situations, a client instance hosted by the cloud computing service may request and receive information from other systems or platforms. For example, a server may store information that pertains to configuration items (CIs) stored in a configuration management database (CMDB) hosted by the client instance. As such, it may be beneficial for the information that is separately stored by the server to be imported into the CMDB. However, it is recognized that there is an overhead associated with each request and receipt of information from the server in terms of processor usage (e.g., computing time, number of processors), storage usage (e.g., primary and/or secondary storage usage), and communication usage (e.g., network traffic, bandwidth). As such, it is desirable to design importation processes that limit this overhead to improve the efficiency and operation of the client instance, as well as the cloud computing service.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to a process for importing license records from a license metric tool server (LMTS) into a configuration management database (CMDB). These license records are requested and received from the LMTS and are subsequently imported into the CMDB as configuration item (CI) data. However, in certain circumstances, a license record may have an identifier field (ID) value that does not correspond to a CI stored within the CMDB and, as a result, the license record fails to import. The present approach involves flagging license records that fail import. The flagged license records are then clustered into groups, and batch requests are made to the LMTS to again request the license records. For example, the LMTS may include an application programming interface (API) that defines a function for requesting license records, wherein the function receives as input an offset parameter that indicates the ID value of the first license record being requested and a limit parameter that indicates the number of license records, beginning at the offset value, that are being requested.

To limit overhead when re-pulling the flagged license records that fail to import, it is recognized that it is desirable to limit the number of calls to the LMTS API, and also to limit the number of license records of each request. With this in mind, present embodiments define A to be the span or total number of license records pulled by an initial import operation, and define M to be a minimum difference between the respective ID values of all flagged license records. Using a sliding window approach, the license records received from the initial request are processed with a sliding window size varying between M and A/2, wherein the sliding window clusters the flagged license records into different groups at different sliding window sizes. Based on the various groupings of the flagged license records at different sliding window sizes, a value K is determined to be the smallest sliding window size that effectively groups the greatest number of failed records. Then, a sliding window of fixed size K is used to cluster the flagged license records into groups, wherein each group represents a distinct request to the LMTS API. For example, for each of these requests, the offset parameter corresponds to the ID value of the first flagged license record of a group, and the limit parameter is less than or equal to K.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
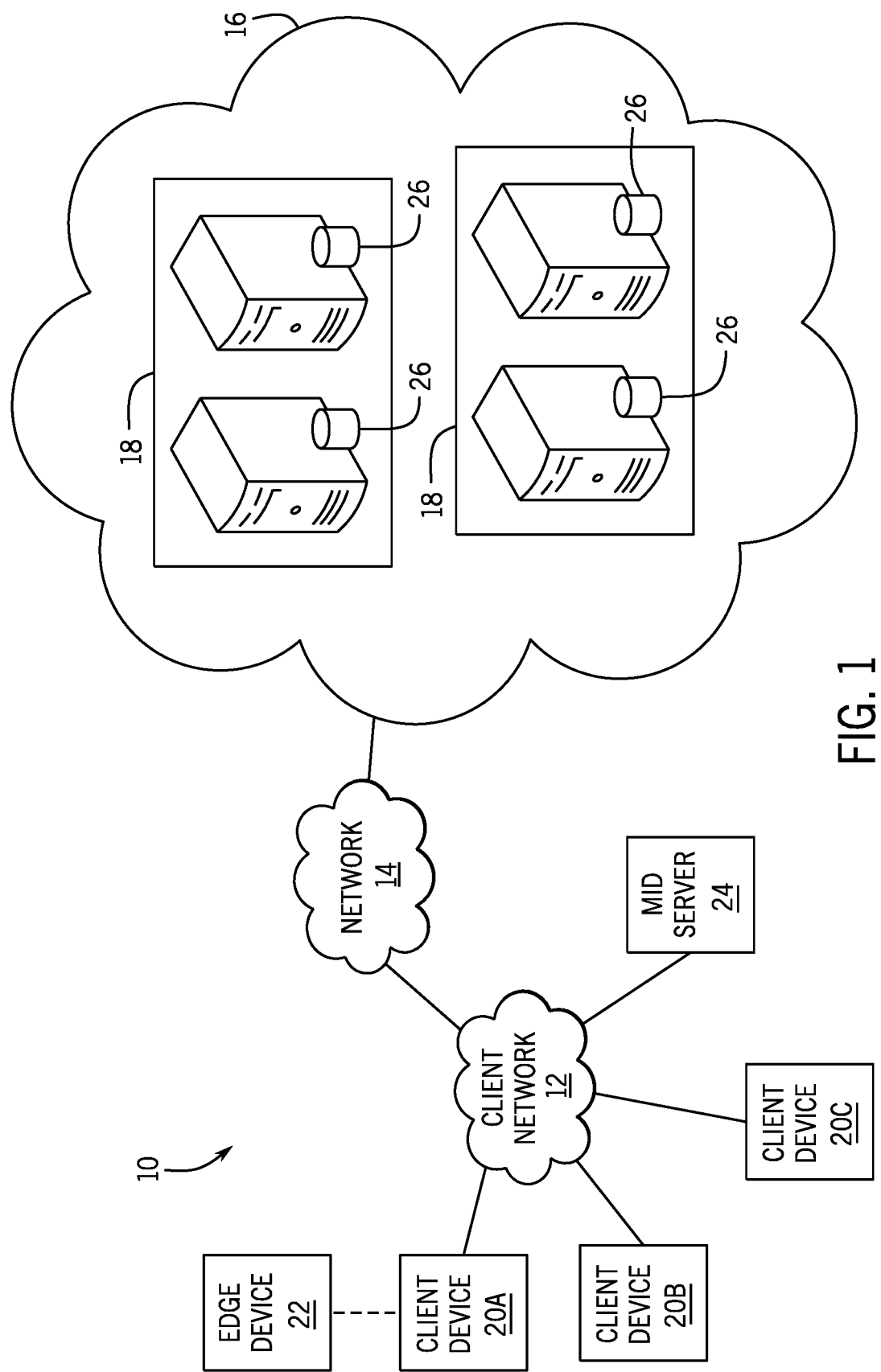
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a configuration management database (CMDB).

Present embodiments are directed to an importation process for importing license records from a license metric tool server (LMTS) into a CMDB of a client instance. These license records are requested and received from the LMTS and are subsequently imported as configuration item (CI) data that is stored in the CMDB. However, in certain circumstances, a license record may have an identifier field (ID) value that does not correspond to a CI stored within the CMDB and, as a result, the license record fails to import. The present approach generally involves flagging license records that fail import, clustering the flagged license records into suitable groups, and then requesting the license records from the LMTS for each group. By effectively clustering of the flagged license records into groups, present embodiments enable a reduction in processing, memory, and/or communication overhead of the importation process, improving operation of the client instance.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
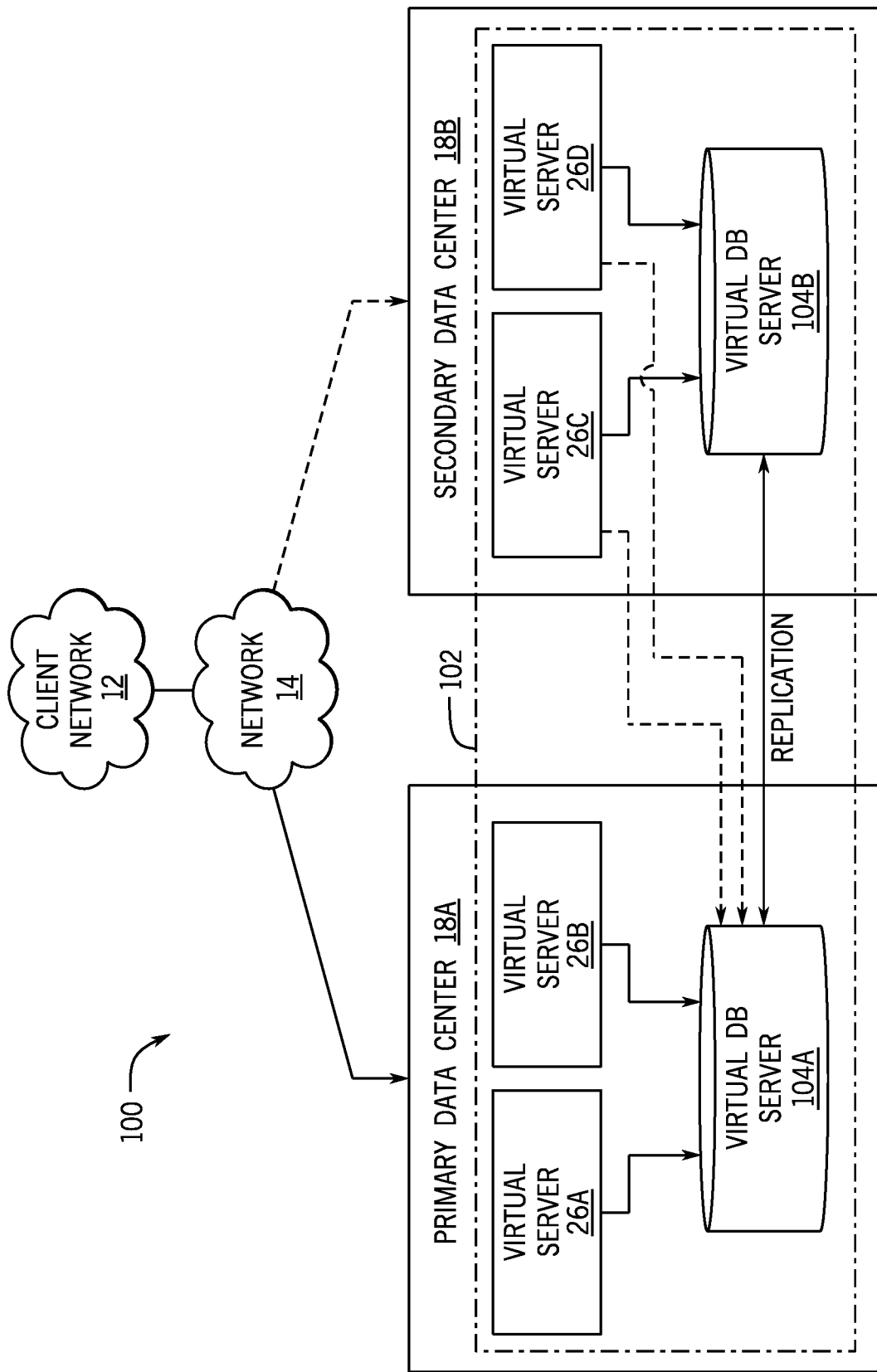
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
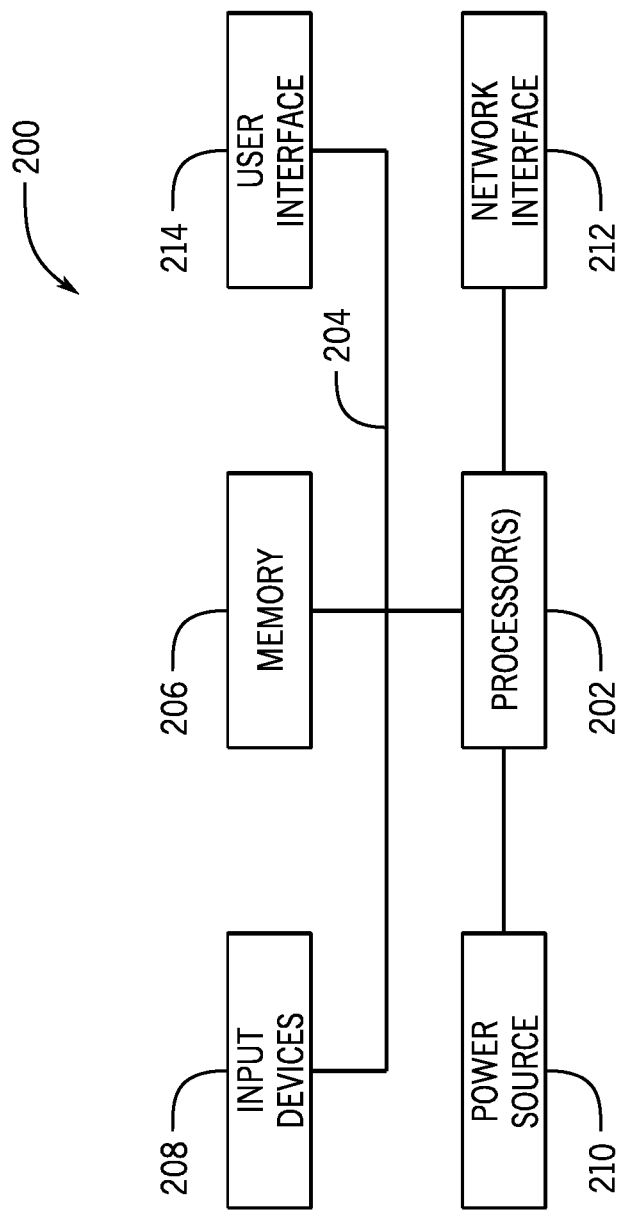
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
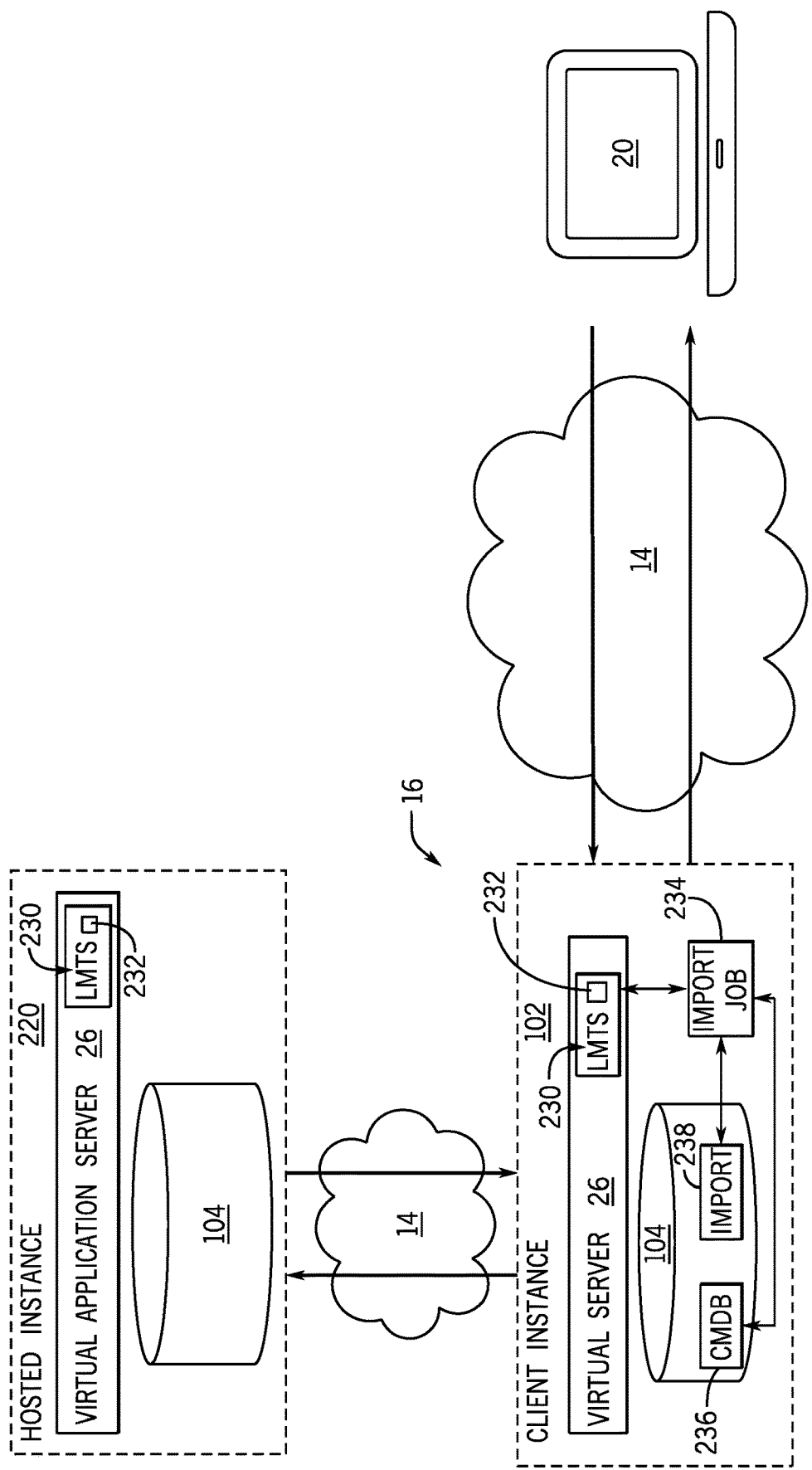
FIG. 4 is a block diagram illustrating an embodiment in which a virtual server supports and enables the client instance, in accordance with aspects of the present disclosure.

With the foregoing in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser. The client instance 102 may also be configured to communicate with other instances, such as the hosted instance 220 shown in FIG. 4, which may also include a virtual application server 26 and a virtual database server 104.

For the illustrated embodiment, a virtual server 26 of the client instance 102 or the hosted instance 220 hosts a license metric tool server (LMTS) 230. In other embodiments, the LMTS 230 may be at least partially hosted by a device (e.g., client device 20, the MID server 24) that is part of the client network 12. The LMTS 230 is an application that includes instructions to scan client devices 20 for software license information 232 (e.g., software license assignments, software license usage, and hardware information) to determine compliance. In certain embodiments, the LMTS 230 may be an IBM LICENSE METRIC TOOL (ILMT) available from IBM (e.g., https://www.ibm.com/software/passportadvantage/ibmlicensemetrictool.html). As such, the LMTS 230 stores the license information 232 collected for the client network 12 in a suitable memory (e.g., a memory of the virtual server 26).

For the embodiments discussed herein, the license information 232 collected and stored by the LMTS 230 includes a plurality of license records (e.g., arranged in a database table). As such, each license record has an identifier field (ID) value that serves as a primary key value, wherein the ID values are created or defined in a sequential order. For example, in an embodiment, the license records of the license information 232 may include sequential ID values that range from zero to ten thousand. Additionally, the LMTS 230 defines an application programming interface (API) that enables the license information 232 collected by the LMTS 230 to be retrieved by other applications, such as an import process or job 234 associated with the client instance 102.

Additionally, the client instance 102 includes a CMDB 236 that stores CI data for the client devices 20 of the client network 12. As such, it is presently recognized that it would be advantageous to store the license information 232 collected by the LMTS 230 as CI data within the CMDB 236. As such, the import job 234 of the client instance 102 includes suitable instructions to retrieve the license information 232 collected by the LMTS 230, determine which license records correspond to which CIs stored in the CMDB 236, and add or update information for the corresponding CIs in the CMDB 236, based on the retrieved license information 232. In certain embodiments, the import job 234 may utilize an import table 238 of the database 104 as a staging area to process and/or transform the license information 232 for importation into the CMDB 236, as discussed below.

The API of the LMTS 230 defines at least one function call to retrieve a series of license records from the license information 232 collected by the LMTS 230. For present embodiments, the API of the LMTS 230 particularly defines a function that retrieves a specified sequence or series of license records based on two supplied parameters: an offset parameter that indicates the ID value of the first license record of the series to be retrieved, and a limit parameter that indicates the number of license records to be retrieved. However, as mentioned, an overhead (e.g., processing, storage, and/or communication overheard) that is associated with each API call to the LMTS 230. As such, it is presently recognized that it is beneficial from an efficiency standpoint to reduce or minimize the number of API calls, as well as the range or span of ID values in each API call, when retrieving the license information 232 from the LMTS 230 for importation into the CMDB 236.

Figure 5:
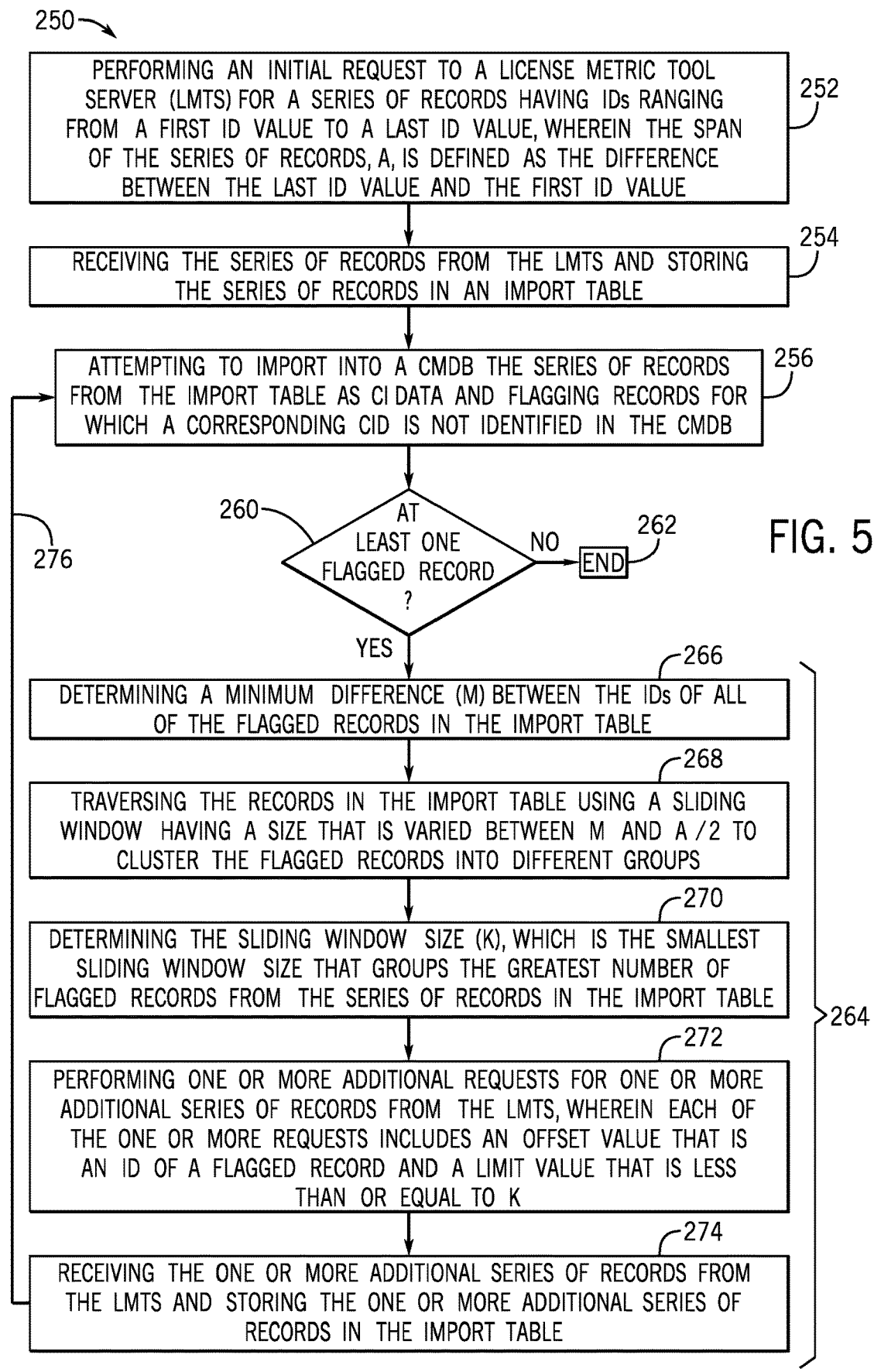
FIG. 5 is a flow diagram illustrating an embodiment of an importation process whereby the client instance retrieves and imports license records from a license metric tool server (LMTS) into a configuration management database (CMDB), in accordance with aspects of the present disclosure.

FIG. 5 is a flow diagram illustrating an embodiment of an importation process 250 whereby an import job 234 of the client instance 102 retrieves and imports license records from the LMTS 230 into the CMDB 236. The illustrated process 250 is merely provided as an example, and in other embodiments, the process 250 may include additional steps, repeated steps, and/or omitted steps relative to the embodiment illustrated in FIG. 5, in accordance with the present disclosure. Additionally, the process 250 may be stored in any suitable memory (e.g., memory 206) and executed by suitable processing circuitry (e.g., processor 202), such as at least one memory and at least one processor of the data center 18. Additionally, the process 250 is discussed with reference to an importation example diagrammatically illustrated in FIG. 6.

The embodiment of the process 250 illustrated in FIG. 5 begins with the processor 202 performing (block 252) an initial request to the LMTS 230 for a series of license records having ID values ranging from a first ID value to a last ID value. As such, the process 250 may determine a span, A, of the series of license records of the initial request as the difference between the last ID value and the first ID value. For the example illustrated in FIG. 6, the initial request to the LMTS 230 includes license records having ID values ranging from zero to 999, which has a span, A, of 1000. As such, the processor 202 may perform an initial call to the API of the LMTS 230 requesting the series of license records using an offset value of zero and a limit value of 1000. Returning to FIG. 5, once the LMTS 230 has fulfilled the initial request, the process 250 continues with the processor 202 receiving (block 254) the requested series of license records from the LMTS 230 and storing the series of records in the import table 238 of the database 104.

The embodiment of the process 250 of FIG. 5 then proceeds with the processor 202 attempting to import (block 256), into the CMDB 236, the series of records from the import table 238. For example, the processor 202 may attempt to identify a CI record of the CMDB 236 having a configuration item identifier (CID) that corresponds to each of the license records in the import table 238, and then may update the CI records based on the corresponding license records. During the importation of block 256, the processor 202 further flags each license record in the import table 238 that fails to import into the CMDB, for example, because a CID that corresponds to the license record was not located in the CMDB. This can result, for example, when the license data stored by the LMTS 230 is relatively stale to the CMDB data, or vice versa. In certain embodiments, the import table 238 may include a flag field that stores a binary value that is set to true to flag a license record. Turning briefly to the example of FIG. 6, the initially requested series of license records range from a first ID value of zero to a last ID value 999, such that the span, A, of the initially requested series of license records is 1000. Additionally, in FIG. 6, a number of license records in the import table 238 have been flagged due to a failure to import into the CMDB. For this example, these include flagged license records 258 having ID values: 200, 250, 300, 450, 670, 720, and 800.

Returning to FIG. 5, the illustrated embodiment of the process 250 proceeds with the processor 202 determining (block 260) whether at least one license record in the import table 238 was flagged in block 256. When the processor 202 determines that all of the license records were properly imported and no license records in the import table were flagged in block 256, then the process 250 concludes (block 262). However, when at least one license record in the import table 238 was flagged in block 256 for failing to import, then the process 250 continues with the processor 202 performing a series of steps, as generally indicated by the bracket 264, to determine and use the most efficient manner to again retrieve, from the LMTS 230, license records that failed to import in block 256.

To determine the most efficient manner to re-pull the license records that failed to import in block 256, the illustrated embodiment of the process 250 continues with the processor 202 determining (block 266) a minimum difference (M) between the ID values of all of the flagged license records 258 in the import table 238. Returning briefly to the example of FIG. 6, each of the flagged license records 258 (e.g., ID values 200, 230, 260, 450, 670, 720, and 800) are processed to determine the smallest numerical distance between the ID values of any two adjacent flagged license records in the import table 238. As such, for the example illustrated in FIG. 6, the minimum difference, M, has a value of 30 (e.g., between ID values 200 and 230 and between ID values 230 and 260).

For the illustrated embodiment, the process 250 continues with the processor 202 traversing (block 268) the series of license records in the import table 238 using a sliding window having a size that is varied between M and A/2 (e.g., half or 50% of the value of the span, A, of the initially requested series of license records) to cluster the flagged license records 258 into groups. Returning to the example of FIG. 6, the series of license records having ID values ranging from zero to 999 is traversed using a sliding window having the smallest window size, 30, and information about the groupings of flagged license records 258 (e.g., number of groups, size or span of each group) is determined and collected. In certain embodiments, the sliding window may traverse the series of license records from the first ID value to the last ID value and/or from the last ID value to the first ID value while the grouping information is collected. Then, the window size is incremented to a value of 31, and information about the groupings of flagged license records 258 is again determined and collected. This process is repeated for each window size until after the maximum window size value of A/2, 500, is reached.

For the embodiment illustrated in FIG. 5, the process 250 continues with the processor 202 determining (block 270) the sliding window size value, K, to be the smallest sliding window size that groups the greatest number of flagged license records 258 from the series of records in the import table 238. Returning again to the example illustrated in FIG. 6, the sliding window analysis technique of block 270 results in the following cluster or grouping information being collected at different sliding window sizes. For example, when the sliding window size begins at a value of 30, the flagged license records 258 form two groups of two flagged records (e.g., IDs 200 and 230; and IDs 670 and 720) and three groups with a single flagged record (e.g., IDs 260, 450, and 800). When the sliding window size is increased to 60, the flagged license records 258 form one group of three flagged records (e.g., IDs 200, 230, and 260), one group of two flagged records (e.g., IDs 670 and 720), and two groups with a single flagged record (e.g., IDs 450 and 800). When the sliding window size is increased to 130, the flagged license records 258 form two group of three flagged records (e.g., IDs 200, 230, and 260; and IDs 670, 720, and 800) and one group with a single flagged record (e.g., IDs 450). When the sliding window size is increased to 250, the flagged license records 258 form a single group of four flagged records (e.g., IDs 200, 230, 260 and 450) and a single group with a three flagged record (e.g., IDs 670, 720, and 800). When the sliding window size is increased to 470, the flagged license records 258 form a single group of five flagged records (e.g., IDs 200, 230, 260, 450, and 670) and a single group with a two flagged record (e.g., IDs 720, and 800).

As mentioned, it is presently recognized that it is beneficial from an efficiency standpoint to reduce or minimize the number of requests to the LMTS 230, as well as the range or span of ID values in each request, when retrieving the flagged license records 258. As such, it may be appreciated that the desired sliding window size, K, may be determined in different manners in different embodiments to improve or optimize efficiency. For example, in certain embodiments, the value of K may be determined by computing a respective cluster score for each sliding window size, wherein the greatest cluster score corresponds to the desired sliding window size, K. For the example illustrated in FIG. 6, in an embodiment, the cluster score for a particular sliding window size may be calculated from a ratio of the number of flagged license records 258 in the largest group of flagged license records 258 to the particular sliding window size. In certain embodiments, this ratio may further be modified using additional terms that represent how the flagged license records 258 are being grouped, such as terms that represent the number of groups and/or the span of each group.

Figure 6:
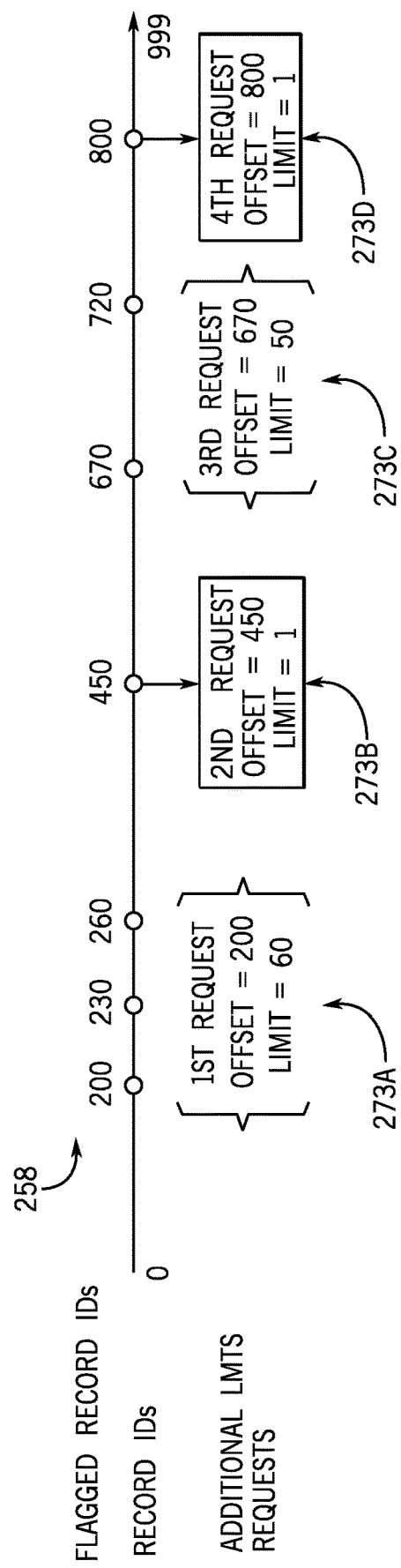
FIG. 6 is a diagram illustrating an example in which the importation process of FIG. 5 is performed for a first set of license information, in accordance with aspects of the present disclosure.

For the example of FIG. 6, when the sliding window has a particular size, the cluster score may be calculated by first calculating the ratio of the largest number of flagged license records 258 in a group to the particular sliding window size. Then, the ratio may be modified (e.g., multiplied by, added to) additional terms, based on the collected grouping information, that capture how the flagged license records 258 are clustered into groups having more than one flagged license record (e.g., groups having a span greater than 1). For example, for the example grouping information set forth above, when the sliding window size is 30, the cluster score may be calculated as the ratio 2/30 multiplied by 4 (2×2, for two groups having two flagged records), resulting in a value of 0.13. When the sliding window size is 60, the cluster score may be calculated as the ratio 3/60 multiplied by 3 (1×3, for one group having three flagged records) and multiplied by 2 (1×2, for one group having two flagged records), resulting in a value of 0.3. When the sliding window size is 130, the cluster score may be calculated as the ratio 3/130 multiplied by 6 (2×3, for two groups having three flagged records), resulting in a value of 0.14. When the sliding window size is 250, the cluster score may be calculated as the ratio 4/250 multiplied by 4 (1×4, for one groups having four flagged records) and multiplied by 3 (1×3, for one group having three flagged records), resulting in a value of 0.19. When the sliding window size is 470, the cluster score may be calculated as the ratio 5/470 multiplied by 5 (1×5, for one group having five flagged records) and multiplied by 2 (1×2, for one group having two flagged records), resulting in a value of 0.11. For this example, based on the highest relative calculated cluster score value of 0.3, the value of K is determined to be 60, as this represents the smallest window size that groups the greatest number of the flagged license records 258 in the import table 238. It may be appreciated that the example above describes one method of determining K that is not intended to be limiting. Indeed, in other embodiments, the cluster score or K may be additionally or alternatively determined using terms that are representative of other considerations, such as maximizing or minimizing the total number of groups, minimizing the number of groups having a single flagged record, maximizing the number of larger groups of flagged records, maximizing the distance between the groups of flagged records, and so forth, in accordance with the present disclosure.

Once the value for sliding window size, K, has been determined in block 270, the process 250 continues with the processor 202 performing (block 272) one or more additional requests for one or more additional series of records from the LMTS, wherein each of the requests includes an offset value that is an ID of a flagged license record and a limit value that is less than or equal to K. In a logical sense, this corresponds to again traversing the initial series of license records in the import table using a second sliding window that has a fixed sliding window size, K, and clustering the flagged license records into groups for retrieval. Turning again to the example of FIG. 6, after determining that the value of K is 60, the flagged license records 258 are requested from the LMTS in four groups or batches, each having a span or range of 60 license records. For the illustrated example, these requests include: a first request 273A with an offset value of 200 and a limit value of 60, a second request 273B with an offset value of 450 and a limit value of 1, a third request 273C with an offset value of 670 and a limit value of 50, and a fourth request 273D with an offset value of 800 and a limit value of 1. It may be noted that each offset value corresponds to the ID value of the first flagged license record of each group, and that the limit values each have a value of K (e.g., 60) or less. As such, requesting the additional series of license records in this manner limits the number of requests to the LMTS 230 to re-pull the flagged license records. Furthermore, requesting the additional series of license records in this manner also limits the span or range of ID values in each request, such that fewer successfully-imported license records are re-pulled with the flagged license records 258. Additionally, as discussed above, due to the overhead associated with each request, requesting the flagged license records 258 in four batches reduces the overhead associated with retrieving these records relative to other techniques (e.g., individually requesting each of the flagged license records 258), improving the performance of the importation process 250 and the operation of the client instance 102.

Returning to FIG. 5, once the LMTS has fulfilled the additional requests, the illustrated embodiment of the process 250 continues with the processor 202 receiving (block 274) the additional series of license records from the LMTS and storing each additional series of records in the import table of the database 104. For example, in certain embodiments, the license records that are received as part of the one or more additional series of license records from the LMTS 230 overwrite at least a portion of the license records data stored in the import table 238 in block 254. After receiving each the additional series of license records, the processor 202 returns to block 256, as indicated by the arrow 276, and attempts to import the series of records in the import table 238 into the CMDB 236. As such, in certain embodiments, the processor 202 may continue to repeat the actions of blocks 260, 266, 268, 270, 272, and 274 until no records are flagged for failing to import, and then the process concludes at block 262.

Figure 7:
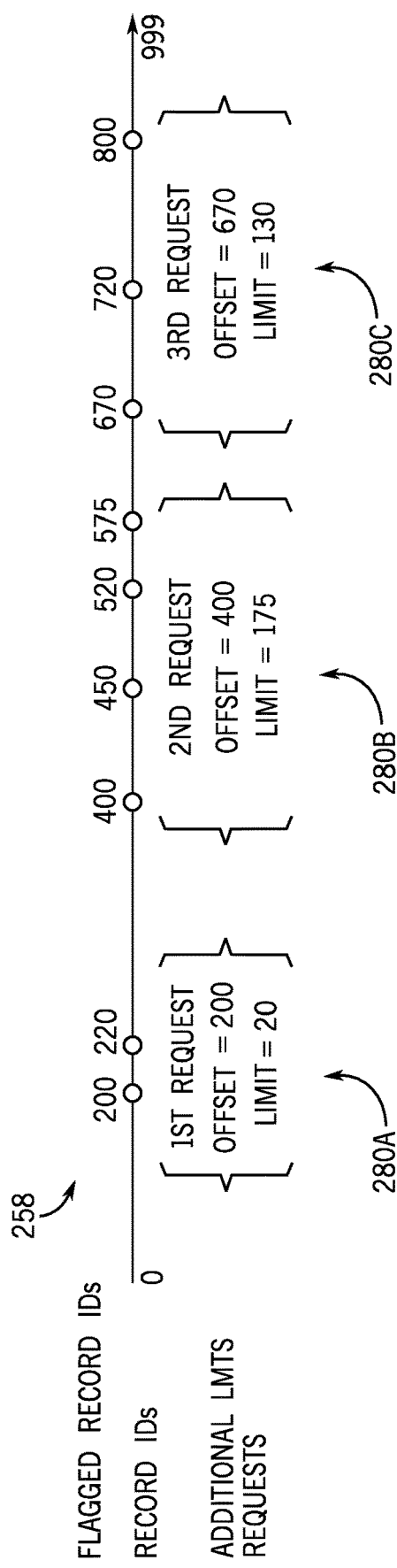
FIG. 7 is a diagram illustrating another example in which the importation process of FIG. 5 is performed for a second set of license information, in accordance with aspects of the present disclosure.

FIG. 7 is a diagram that illustrates another example of executing the importation process 250 of FIG. 5 with different license information relative to the example of FIG. 6. For the example of FIG. 7, the initial request to the LMTS 230 is for a series of license records having ID values ranging from a first ID value of zero to a second ID value of 999. The received series of license records is stored in the import table 238, and the stored license records are then imported into a CI table of the CMDB 236. The stored license records that fail to import are flagged. For the illustrated example, the flagged license records 258 include ID values: 200, 220, 400, 450, 520, 575, 670, 720, and 800.

For the example of FIG. 7, the importation process 250 continues with determining the minimum difference, M, between the ID values of the flagged license records 258. For this example, M is determined to have a value of 20, which occurs between flagged license record ID values 200 and 220. As such, a sliding window is applied to the series of license records, wherein the size of the sliding window is varied between M (having a value of 20) and A/2 (having a value of 500). From the results of this step, the desired sliding window size, K, is determined to have a value of 175. As such, the flagged license records 258 are again requested from the LMTS using a number of batch requests, including a first request 280A with an offset value of 200 and a limit value of 20, a second request 280B with an offset value of 400 and a limit value of 175, a third request 280C with an offset value of 670 and a limit value of 130. As discussed above, due to the overhead associated with each request, requesting the flagged license records 258 in three batches reduces the overhead associated with retrieving these flagged license records 258 relative to other techniques (e.g., individually re-pulling each of the flagged records or re-pulling the entire initial series of license records), improving the performance of the importation process 250 and the operation of the client instance 102.

Figure 8:
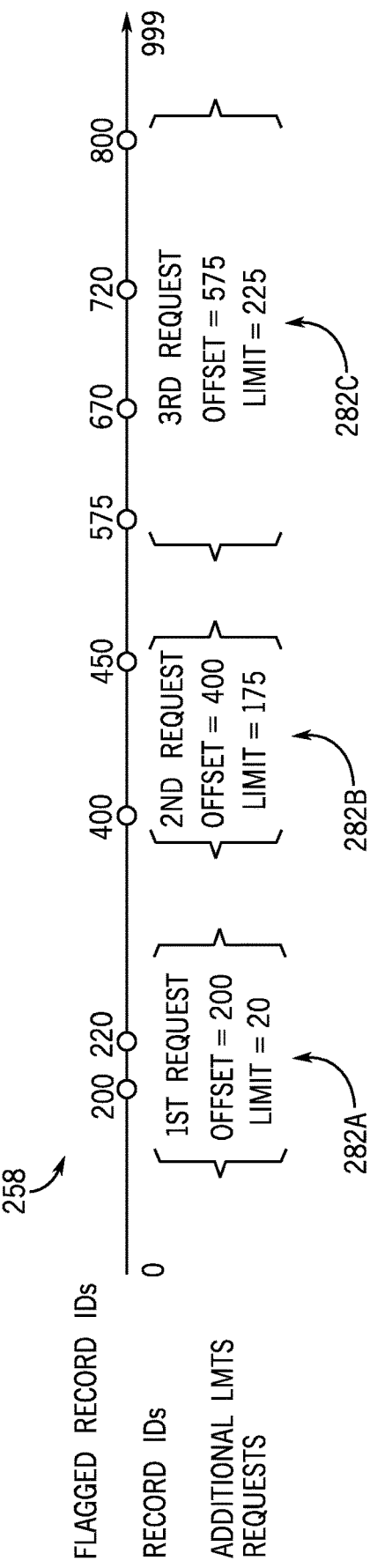
FIG. 8 is a diagram illustrating yet another example in which the importation process of FIG. 5 is performed for a third set of license information, in accordance with aspects of the present disclosure.

FIG. 8 is a diagram that illustrates yet another example of executing the importation process 250 of FIG. 5 with different license information. For the example of FIG. 8, the initial request to the LMTS 230 is for a series of license records having ID values ranging from zero to 999. The received series of license records is stored in the import table 238, and the stored license records are then imported into a CI table of the CMDB 236. The stored license records that fail to import are flagged. For the illustrated example, the flagged license records 258 include ID values: 200, 220, 400, 450, 575, 670, 720, and 800.

For the example of FIG. 8, the importation process 250 continues with determining the minimum difference, M, between the ID values of the flagged license records 258. For this example, M is determined to have a value of 20, which occurs between the flagged license records 258 having ID values 200 and 220. As such, a sliding window is applied to the range of license records from zero to 999, wherein the size of the sliding window is varied between M (having a value of 20) and A/2 (having a value of 500). From the results of this step, the desired sliding window size, K, is determined to have a value of 225. As such, the flagged license records 258 are again requested from the LMTS using a number of batch requests, including a first request 282A with an offset value of 200 and a limit value of 20, a second request 282B with an offset value of 400 and a limit value of 50, a third request 282C with an offset value of 575 and a limit value of 225. As discussed above, due to the overhead associated with each request, requesting the flagged license records 258 in three batches reduces the overhead associated with retrieving these flagged license records 258 relative to other techniques (e.g., individually re-pulling each of the flagged license records or re-pulling the initial series of license records), improving the performance of the importation process 250 and the operation of the client instance 102.

The technical effects of the disclosed technique include an efficient importation process for importing license records from a LMTS. The importation process includes a series of steps that are performed to handle situations in which license records fail to import, wherein the process includes: flagging these license records, clustering the flagged license records into groups, and then requesting the license records from the LMTS for each group. By effectively clustering of the flagged license records into groups, present embodiments enable a reduction in processing, memory, and/or communication overhead of the importation process, improving the efficiency of the importation process and the operation of the client instance.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud-based computing system, comprising:
at least one memory storing a configuration management database (CMDB) and a license management tool server (LMTS), wherein the LMTS comprises an application programming interface (API) having a function configured to return series of license records having sequential identifier field (ID) values in response to function calls from the CMDB; and
at least one processor configured to execute stored instructions to perform actions, comprising:
calling the function of the API of the LMTS a first time to return an initial series of license records;
importing, into the CMDB, the initial series of license records and flagging the license records of the initial series that fail to import due to having respective ID values that do not correspond to configuration items (CIs) stored in the CMDB;
clustering the flagged license records of the initial series that failed to import into groups of flagged license records using a sliding window technique;
calling the function of the API of the LMTS additional times to return a respective additional series of license records for each of the groups of flagged license records, wherein a first overhead associated with executing the function the additional times is less than a second overhead associated with executing the function to return the initial series of license records and less than a third overhead associated with successively executing the function to individually return each of the flagged license records; and
importing, into the CMDB, the respective additional series of license records returned for each of the groups of flagged license records.

2. The cloud-based computing system of claim 1, wherein the license records of the initial series have sequential ID values ranging from a first ID value to a last ID value, and wherein, to call the function of the API of the LMTS the first time to return the initial series of license records, the at least one processor is configured to execute the stored instructions to perform actions, comprising:
calling the function of the API of the LMTS the first time using an offset parameter value that is the first ID value and a limit parameter value that is a difference between the last ID value and the first ID value.

3. The cloud-based computing system of claim 1, wherein, to use the sliding window technique to cluster the flagged license records of the initial series that failed to import, the at least one processor is configured to execute the stored instructions to perform actions, comprising:
determining a minimum difference, M, between the respective ID values of the flagged license records of the initial series;
traversing the initial series of license records using a sliding window, wherein a sliding window size is varied between M and A/2 to determine the sliding window size, K, to cluster the flagged license records, wherein A is a span of the initial series; and
clustering the flagged license records of the initial series into the groups of flagged license records, wherein a respective span of each of the groups of flagged license records is less than or equal to K.

4. The cloud-based computing system of claim 3, wherein, to determine the sliding window size, K, to cluster the flagged license records, the at least one processor is configured to execute the stored instructions to perform actions, comprising:
calculating a respective cluster score for each respective sliding window size; and
determining the sliding window size, K, to be the respective sliding window size with a highest respective cluster score.

5. The cloud-based computing system of claim 4, wherein the cluster score is calculated based on a ratio of a number of the flagged license records in a largest group of flagged license records to the respective sliding window size, a number of the groups of the flagged license records, a respective number of flagged license records in each of the groups of flagged license records, or a combination thereof.

6. The cloud-based computing system of claim 3, wherein, to call the function of the API of the LMTS the additional times to request the respective additional series of license records for each group of the groups of flagged license records, the at least one processor is configured to execute the stored instructions to perform actions, comprising:
calling the function of the API of the LMTS an additional time to return the respective additional series of license records for each group using an offset parameter value that is a respective first ID value of each group and a limit parameter value that is a respective span of each group, wherein the limit parameter value is less than or equal to K.

7. The cloud-based computing system of claim 1, wherein, to import the respective additional series of license records, the at least one processor is configured to execute the stored instructions to perform actions, comprising:
flagging license records of each respective additional series of license records having respective ID values that do not correspond to the CIs stored in the CMDB.

8. The cloud-based computing system of claim 1, wherein the first overhead, the second overhead, and the third overhead comprise usage of the at least one processor, usage of the at least one memory, and communication between the CMDB and the LMTS.

9. A method, comprising:
calling a function of an application programming interface (API) of a license management tool server (LMTS) a first time to return an initial series of license records having sequential identifier field (ID) values;
importing, into a configuration management database (CMDB), the initial series of license records and flagging license records of the initial series that fail to import due to having respective ID values that do not correspond to configuration items (CIs) stored in the CMDB;
clustering the flagged license records of the initial series that failed to import into groups of flagged license records using a sliding window technique;
calling the function of the API of the LMTS additional times to return a respective additional series of license records for each of the groups of flagged license records, wherein a first overhead associated with executing the function the additional times is less than a second overhead associated with executing the function to return the initial series of license records and less than a third overhead associated with successively executing the function to individually return each of the flagged license records;
and
importing, into the CMDB, the respective additional series of license records returned for each of the groups of flagged license records.

10. The method of claim 9, wherein the license records of the initial series have sequential ID values with a span, A, ranging from a first ID value to a last ID value, and calling the function of the API of the LMTS the first time to request the initial series of license records comprises:
calling the function of the API of the LMTS the first time using an offset parameter value that is the first ID value and a limit parameter value that is the span, A, of the initial series of license records.

11. The method of claim 9, wherein the initial series of license records has a span, A, and wherein clustering the flagged license records of the initial series comprises:
determining a minimum difference, M, between the respective ID values of the flagged license records of the initial series; and
traversing the initial series of license records using a sliding window having a sliding window size that is varied between M and A/2 to determine the sliding window size, K, to group the flagged license records of the import table, wherein a respective span of each respective additional series of license records is less than or equal to K.

12. The method of claim 9, wherein the first overhead, the second overhead, and the third overhead comprise usage of at least one processor, usage of at least one memory, and communication between the CMDB and the LMTS.

13. The method of claim 11, wherein determining the sliding window size, K, to group the flagged license records comprises:
calculating a respective cluster score for each respective sliding window size; and
determining the sliding window size, K, to be the respective sliding window size having a highest respective cluster score.

14. The method of claim 13, wherein calculating the respective cluster score for each respective sliding window size comprises:
for each respective sliding window size between M and A/2:
calculating a ratio of a number of flagged license records in a largest group of the flagged license records to the respective sliding window size; and
modifying the ratio with one or more terms representing a number of the groups of flagged license records, a respective number of flagged license records in each of the groups of the flagged license records, or a combination thereof, to calculate the respective cluster score at the respective sliding window size.

15. The method of claim 11, wherein calling the function of the API of the LMTS the additional times to return the respective additional series of license records for each group of the groups of flagged license records comprises:
calling the function of the API of the LMTS an additional time to return the respective additional series of license records for each group using an offset parameter value that is a respective first ID value of each group and a limit parameter value that is a respective span of each group, wherein the limit parameter value is less than or equal to K.

16. A non-transitory, computer-readable medium storing instructions executable by a processor of a computing device to import data from a license management tool server (LMTS) into configuration items (CIs) stored in a configuration management database (CMDB), the instructions comprising instructions to:
call a function of an application programming interface (API) of the LMTS a first time to return an initial series of license records having a span, A, of sequential ID values ranging from a first ID value to a last ID value, wherein the function is called the first time with an offset parameter value that is the first ID value and a limit parameter value that is equal to the span, A, of the initial series;
store the initial series of license records in an import table;
import the initial series of license records from the import table into the CMDB and flag license records in the import table that fail to import into the CMDB;
determine a minimum difference, M, between the respective ID values of the flagged license records of the import table;
traverse the license records of the import table using a sliding window having a sliding window size that is varied between M and A/2 to determine the sliding window size, K, to group the flagged license records of the import table;
call the function of the API of the LMTS additional times to return a respective additional series of license records for each group of the groups of flagged license records, wherein the function is called an additional time to return the respective additional series of license records for each group with the offset parameter value that is a respective first ID value of each group and the limit parameter value that is a respective span of each group, wherein the respective span of each group is less than or equal to K, and wherein a first overhead associated with executing the function the additional times is less than a second overhead associated with executing the function to return the initial series of license records and less than a third overhead associated with successively executing the function to individually return each of the flagged license records;
store the respective additional series of license records returned for each of the groups of flagged license records in the import table; and
import each respective additional series of license records from the import table into the CMDB.

17. The non-transitory, computer-readable medium of claim 16, wherein the instructions to determine the sliding window size, K, to cluster the flagged license records comprise instructions to:
calculate a respective cluster score for each sliding window size between M and A/2; and
determining the sliding window size, K, to be the respective sliding window size having a highest calculated cluster score.

18. The non-transitory, computer-readable medium of claim 17, wherein the instructions to calculate the respective cluster score for each respective sliding window size comprise instructions to:
for each respective sliding window size from M to A/2:
calculate a ratio of a number of the flagged license records in a largest group of the flagged license records to the respective sliding window size; and
modify the ratio with one or more terms representing grouping information of the groups of flagged license records to calculate the respective cluster score at the respective sliding window size.

19. The non-transitory, computer-readable medium of claim 18, wherein the instructions modify the ratio comprise instructions to:
multiply the ratio by a count of the groups of the flagged license records having a respective span greater than one and by a number of flagged license records in each of the groups of flagged license records having the respective span greater than one.

\* \* \* \* \*